US010428923B2

(12) United States Patent
Spielman (10) Patent No.: US 10,428,923 B2
(45) Date of Patent: Oct. 1, 2019

(54) TORQUE CONVERTER OIL COOLING SYSTEM AND METHOD OF USE

(71) Applicant: TowHaul Corporation, Bozeman, MT (US)

(72) Inventor: Harold W. Spielman, Abbotsford (CA)

(73) Assignee: TowHaul Corporation, Bozeman, MT (US)

( * ) Notice: Subject to any disclaimer, the term of this patent is extended or adjusted under 35 U.S.C. 154(b) by 160 days.

(21) Appl. No.: 15/653,593

(22) Filed: Jul. 19, 2017

(65) Prior Publication Data
US 2019/0024769 A1    Jan. 24, 2019

(51) Int. Cl.
| F16H 41/30 | (2006.01) |
| F16H 41/04 | (2006.01) |
| F16H 61/00 | (2006.01) |
| F16H 61/48 | (2006.01) |
| F16H 61/02 | (2006.01) |
| F16H 57/04 | (2010.01) |
| F16H 59/72 | (2006.01) |

(52) U.S. Cl.
CPC ............. *F16H 41/30* (2013.01); *F16H 41/04* (2013.01); *F16H 57/0412* (2013.01); *F16H 61/0009* (2013.01); *F16H 61/0206* (2013.01); *F16H 61/48* (2013.01); *B60Y 2400/426* (2013.01); *F16H 59/72* (2013.01); *F16H 2061/0037* (2013.01)

(58) Field of Classification Search
CPC ....................................................... F16H 41/30
See application file for complete search history.

(56) References Cited

U.S. PATENT DOCUMENTS

| 3,752,222 A | 8/1973 | Olbermann, Jr. |
| 4,175,388 A | 11/1979 | Milbreath et al. |
| 4,680,928 A * | 7/1987 | Nishikawa ............ F15B 21/042 192/3.28 |
| 4,688,545 A * | 8/1987 | Patterson ................ F24B 1/006 110/203 |
| 5,058,716 A | 10/1991 | Lippe et al. |
| 6,419,059 B1 | 7/2002 | Nobu et al. |
| 7,036,640 B2 * | 5/2006 | Spielman ................ F16D 65/78 188/264 CC |
| 7,967,561 B2 * | 6/2011 | Samie ..................... F16H 41/30 192/113.21 |
| 8,133,156 B2 | 3/2012 | Barney et al. |
| 8,172,053 B2 | 5/2012 | Leichsenring et al. |

(Continued)

*Primary Examiner* — David R Morris
(74) *Attorney, Agent, or Firm* — Clark & Brody (57) ABSTRACT

A torque converter oil cooling system includes an air-oil cooler system that is adapted to be disposed between a torque converter charging oil outlet and charging oil inlet. The torque converter oil cooling system has a controller that directs oil when at a predetermined temperature to pass through an air oil cooler for cooling and then directs the cooled oil back to the inlet of the torque converter for torque converter operation. The torque converter oil cooling system normally operates in the non-lockup mode operation of the torque converter. Using the torque converter oil cooling system permits a vehicle to continuously operate in a torque converter mode for an extended period of time, which becomes extremely helpful when the vehicle is called upon to haul heavy loads over steep grades.

9 Claims, 6 Drawing Sheets

(56) References Cited

U.S. PATENT DOCUMENTS

| | | | |
|---|---|---|---|
| 8,224,549 B2* | 7/2012 | Grubb | B60W 10/023 |
| | | | 701/69 |
| 8,453,440 B2 | 6/2013 | Busch | |
| 8,499,912 B2 | 8/2013 | Samie et al. | |
| 8,646,264 B2* | 2/2014 | Rampen | F01P 7/044 |
| | | | 60/329 |
| 9,611,127 B2* | 4/2017 | Sakai | F16H 41/30 |
| 9,964,019 B2* | 5/2018 | Gopal | F01P 3/20 |
| 2004/0129514 A1* | 7/2004 | Spielman | F16D 65/78 |
| | | | 188/264 D |
| 2004/0187505 A1 | 9/2004 | Hoff et al. | |
| 2009/0035129 A1 | 2/2009 | Samie et al. | |
| 2009/0131222 A1* | 5/2009 | Barney | F01P 7/06 |
| | | | 477/174 |
| 2009/0235657 A1* | 9/2009 | Rampen | F01P 7/044 |
| | | | 60/456 |
| 2009/0298647 A1* | 12/2009 | Leichsenring | F16H 41/30 |
| | | | 477/168 |
| 2009/0308064 A1* | 12/2009 | Busch | F16H 41/30 |
| | | | 60/337 |
| 2011/0066348 A1 | 3/2011 | Grubb | |
| 2012/0152678 A1* | 6/2012 | Samie | F16H 45/02 |
| | | | 192/3.3 |
| 2014/0373521 A1 | 12/2014 | DeVita et al. | |
| 2015/0375973 A1 | 12/2015 | Sakai et al. | |
| 2016/0138878 A1 | 5/2016 | Gopal | |

* cited by examiner

Fig. 1

PRIOR ART

Fig. 4B — 13.8% EFFECTIVE GRADE

Fig. 4A — 8.0% EFFECTIVE GRADE

PRIOR ART

TORQUE CONVERTER OIL COOLING SYSTEM AND METHOD OF USE

FIELD OF THE INVENTION

The invention relates to a torque converter oil cooling system and, in particular to a cooling system that uses air to provide further cooling of the torque converter oil, and in particular, allows a vehicle that has the torque converter to be used for hauling high tonnage loads.

BACKGROUND ART

The use of torque converters in connection with transmissions is well known in the prior art. In some vehicles, usually automobiles, the torque converter is part and parcel of the transmission, whereas in other vehicles, e.g., mining vehicles, the torque converter is a separate stand-alone system. That is, these latter kinds of torque converters are mounted directly to the engine casing and flywheel and they transmit the output torque to the transmission as a separate entity via a drive shaft.

In general, a torque converter input is mounted directly to the engine housing and connected to the engine flywheel. The output shaft is connected to the transmission by means of a drive shaft. The torque converter transmits the engine torque to the transmission and ultimately to the drive wheels. The role of a torque converter can be summarized as: (1) being able to multiply torque generated by the engine, (2) serving as an automatic clutch to transmit engine torque to the transmission; (3) absorbing torsional vibration of the engine and drive train; (4), smoothing out engine rotation, and (5) driving the oil pumps of the hydraulic system.

Figure 1:
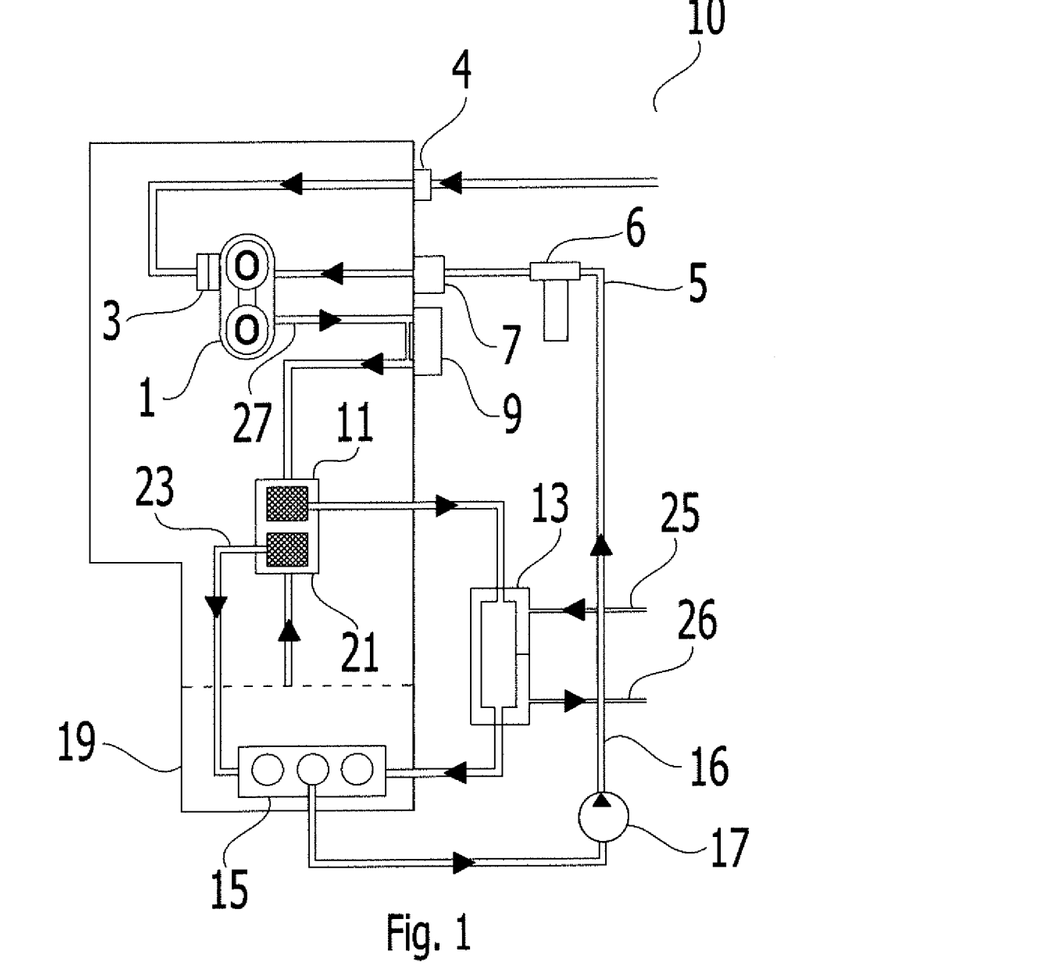
FIG. 1 is a schematic drawing of a prior art torque converter system.

FIG. 1 shows a schematic drawing of a particular torque converter system, which is designated by the reference numeral 10. The system includes the torque converter 1, lockup clutch 3, a torque converter inlet designated by the reference numeral 5. The inlet 5 can include a charging inlet filter 6 and an inlet relief valve 7. The torque converter also includes an outlet relief valve 9. Other components include a torque converter outlet screen 11, water to oil cooler 13, a pump suction manifold 15, and a charging pump 17. A sump 19 is also provided that contains the pump suction manifold 15 and a circuit using a magnetic screen 21, whose outlet 23 is in communication with the pump suction manifold 15. The water to oil cooler 13 uses cooling water from source 25, e.g., a radiator of the vehicle having the torque converter. The cooling water passes through the radiator of the water to oil cooler 13 and returns to the cooling system of the vehicle via line 26.

In operation, charge oil is pumped out of the torque converter sump 19 and introduced to the impeller, turbine, and stator cavity of the torque converter 1. The impeller is an integral part of the torque converter casing and has many curved vanes that are radially mounted inside; a guide ring is installed on the inner edges of the vanes to provide a path for smooth fluid flow. The impeller rotates when the engine is running. The turbine is located inside the torque converter case and is not connected to it. The torque converter output shaft is attached by a spline hub to the turbine. Many cupped vanes are attached to the turbine. When the charge oil is introduced and thrust from the rotating impeller vanes, it is caught in the cupped vanes of the turbine and torque is transferred to the torque converter output shaft, turning it in the same direction as the engine crankshaft. The stator is located between the impeller and the turbine and catches the oil from the turbine and redirects it to the back side of the impeller; thus the torque output of the torque converter is multiplied. As these parts of a torque converter are well known, there is no need for their precise illustration to understand how the torque converter functions.

In a further description of the operation of the torque converter, the oil exiting the charging pump 17 passes through the inlet 5, i.e., the charging inlet filter 6 and inlet relief valve 7 to the torque converter 1. Oil exiting the torque converter as 27 passes through the outlet relief valve 9, through the outlet screen 11 and to the water to oil cooler 13. The cooled oil is then directed to the pump suction manifold 15, wherein it can be recirculated using the magnetic screen 21 and directed back to an inlet of the charging pump 17.

The torque converter also includes a lockup clutch 3. The lockup clutch directly links the output of the engine to the transmission, thus bypassing the torque converter. The system 10 includes a control valve 4 that receives a lockup signal from the transmission. This signal causes the lockup clutch to operate so that the vehicle is in lockup condition and the torque converter function is bypassed.

The action of redirecting the charge oil by the stator, while increasing torque output significantly at a lower speed also creates a significant loss component which manifests as heat added to the charge oil. The charge oil is expelled from the impeller and exits the torque converter to the water-oil cooler 13 which carries only part of this heat component to the engine radiator to be expelled. This heat release is adequate to provide a high torque start of short duration to assist initial vehicle motion, but continual operation of the vehicle in a high torque condition is not possible without over heating the charge oil and rendering the torque converter inoperative. This is particularly so when prime movers or mining vehicles are tasked to haul heavy equipment using a lowboy trailer.

Often times, the lowboy trailers are hauled to and from a particular site in a mining operation and experience grades during the hauling. As the speed of the lowboy trailers is very low due to the weight of the equipment being hauled and a grade that the vehicle traverses, a prime mover would have to operate for an extended period of time along such a grade and current systems do not permit this kind of low speed continual operation for the torque converter. The safe time on grade allowed, depends on the speed range of the vehicle, and some vehicles will go to a lock up condition at approximately 5 mph. The slower the speed of the torque converter output shaft and hence the vehicle, the greater the heat component produced in during torque converter operation.

Therefore, there is a need in the industry, particularly when hauling equipment using lowboy trailers, to improve the performance of the prime movers in these applications. That is, the design of torque converters in these types of vehicle does not allow the for hauling lowboy trailers over steep grades as too much heat is generated during the torque converter operation and the vehicles will just stall out. These prior art torque converters just cannot operate for a continual and extended period of time.

Therefore, a need exists to improve vehicles that encounter the conditions described above, especially prime movers hauling heavy mining equipment.

SUMMARY OF THE INVENTION

One object of the invention is to provide a torque converter oil cooling system for use in a vehicle, particularly a vehicle that requires operating the torque converter for extended and continuing periods of time.

Another object of the invention is the combination of the torque converter oil cooling system and a vehicle.

Yet another object of the invention is a method of cooling the oil of a torque converter, when the torque converter is not in lockup mode and is operating in torque converter mode for an extended period of time.

One other object of the invention is the use of a torque converter oil cooling system on a vehicle, such as a prime mover, when the vehicle is towing a large load like mining equipment on a lowboy trailer.

The inventive torque converter oil cooling system comprises an inlet to receive oil discharged for a torque converter charging pump and an oil cooler coil assembly having a fan configured to blow air across the coil assembly to cool oil passing through the coil assembly, the oil cooler coil assembly having an inlet and an outlet. A diverter valve is provided, the diverter valve directing torque converter oil either back to an inlet for the torque converter or to the inlet of the oil cooler coil assembly for additional cooling of oil.

The system includes a temperature sensor positioned downstream of the torque converter outlet and optionally a pressure sensor from the torque converter lockup line. The temperature sensor is configured to send a signal indicative of a temperature of the oil discharged from the torque converter. The pressure sensor is configured to send a signal indicative of a pressure (lockup mode) or no pressure (non-lockup mode) in the torque converter lockup circuit. A controller is also provided and is adapted to control the position of the diverter valve between an operative position and a bypass position. The operative position is based on a predetermined temperature from the temperature sensor and the absence of pressure in the lockup line, indicating that the torque converter is not in lockup mode. In this mode, the oil of the torque converter is cooled based on a certain oil temperature when the torque converter is operating. The system also has the capability to manually control the diverter valve, which can override the controller and direct charging oil to an oil cooling assembly for cooling even if the torque converter is in the lockup mode. In this mode, the oil exiting the charging oil pump would be cooled even if the torque converter is in lockup mode.

The bypass position is when the oil from the torque converter charging pump bypasses the torque converter oil cooling system and is directed by the diverter valve to the inlet of the torque converter. This bypass mode would normally exist when the torque converter is in lockup mode, i.e., the controller senses this mode via the pressure sensor in the torque converter lockup circuit and sends a signal to move the diverter valve to the bypass position.

The fan used for cooling the torque converter oil can be driven in any way but a preferred way is using a hydraulic drive, the hydraulic oil for the drive being provided by the vehicle having the torque converter thereon.

The torque converter oil cooling system can use an existing pressure sensor located in a lockup signal line of the torque converter system for monitoring the lockup condition of the torque converter system for diverter valve positioning or can include its own pressure sensor.

A manual override controller can be included, preferably located in the cab of the vehicle to allow the operator to send a signal so that the diverter valve is moved from the bypass position to the operative position if the charging oil would need cooling for some reason, even when the torque converter is in lockup mode.

The invention also includes the combination of the inventive torque converter oil cooling system and a vehicle. In this embodiment, the vehicle is such that the torque converter system is separate from a transmission of the vehicle and an oil circuit of the torque converter system is independent of oil used in the vehicle transmission. The vehicle torque converter system includes an oil charging pump to take cooled oil exiting the torque converter system and recirculate the cooled oil to an inlet for the torque converter system for use in a torque converter. The torque converter oil cooling system is installed on the vehicle such that an inlet of the torque converter oil cooling system is in communication with an outlet of the oil charging pump and an outlet of the torque converter oil cooling system is in communication with the inlet of the torque converter system. Preferably, the vehicle is a prime mover like the mining vehicles used in mining operations. These vehicles haul ore or other material obtained from the mine as well as tow lowboy trailers that carry heavy mining equipment.

The invention also includes a method of providing additional cooling capability to the oil of a torque converter on a vehicle. A torque converter essentially multiplies torque when the operational speed of an engine is low. By further cooling the oil exiting the oil cooling charging pump system of a torque converter system using the inventive torque converter oil cooling system, a transport application such as a prime mover hauling a heavy piece of mining equipment using a lowboy trailer that requires a slow speed but high torque operation can be successfully completed. For example, a prime mover with a conventional torque converter system may only be able to tow a lowboy trailer with heavy equipment on it up an 8.0 or 9.0% effective grade. When the vehicle is equipped with the inventive torque converter oil cooling system, a towing can be successfully completed on an effective grade of much more, e.g. 13.8% to as high as 15.4%.

DETAILED DESCRIPTION OF THE INVENTION

In general, the invention is an improvement for torque converters, particularly the types of torque converters used on prime movers that haul heavy equipment using lowboy trailers.

In essence, the invention provides a torque converter oil cooling system that cools the torque converter charge oil after it is picked up by the charge oil pump and moved to the torque converter inlet. With the inventive torque converter oil cooling system in place, the charge oil can continue to circulate through the existing water-oil cooler of the torque converter and return to the pump suction manifold in the sump. When called for, the charging oil pump will then circulate the charge oil through the inventive torque converter oil cooling system, where the additional required heat contained in the oil due to torque converter operation will be rejected before the oil again enters the torque converter.

The torque converter oil cooling system will normally function while the torque converter is in torque converter mode only, unless for some other reason, the temperature of the oil requires further cooling. Thus, in certain instances, the temperature of the oil of the torque converter, even when the torque converter is in lockup mode, may be such that the oil still needs additional cooling and this is realized by a manual override in the torque converter oil cooling system as explained below.

Normally, at torque converter lockup, the charge oil circuit operates as originally designed, bypassing the torque converter oil cooling system. The torque converter oil cooling system is managed by an electronic controller which monitors the charge oil temperature out of the torque converter and a pressure signal from the lockup clutch circuit to indicate lockup or torque converter drive mode. The controller output can activate a diverter valve to direct the charge oil flow through the torque converter oil cooling system. The diverter valve also has the capability to bypass the torque converter oil cooling system when additional oil cooling is not needed. The torque converter oil cooling system preferably uses a fan for oil cooling and the fan speed is managed through a modulated hydraulic control valve operated by the controller. Hydraulic flow input to power the cooler fan is supplied from the vehicle hydraulic system.

The torque converter oil cooling system is primarily designed for use with an industrial torque converter that exist as an individual entity that is mounted directly to an engine casing and flywheel and transmits the output torque to the transmission as a separate entity through a drive shaft. In this arrangement, the torque converter would stand alone with its separate housing from the transmission. This arrangement is found commonly on mining vehicles and the like, which is in direct contrast to automobiles, wherein the torque converter and transmission with gear clutches is a single integral unit. In these industrial-type torque converters, the oil charging circuit is a separate circuit and the oil does not travel to the transmission, it is cooled separately and returns to the torque converter sump for recirculation. Similarly, the torque converter oil cooling system has its own control system so that the existing control system of a vehicle is not altered in any way when the torque converter oil cooling system is employed on a vehicle.

What the torque converter oil cooling system does is further cool the torque converter oil in order to release an increased torque output from the torque converter on a continual basis to yield a greater rimpull force at the drive wheels of a vehicle. This can enable a significant improvement in towing trailers on steeper grades as is discussed below.

The torque converter oil cooling system does not intervene in the control of a shifting process of a vehicle. The torque converter oil cooling system only controls the temperature of the charging oil of the torque converter system to provide a stable maximum temperature for the torque converter charge oil circuit, so as to release additional torque on a continual basis when resistance is encountered by a vehicle traveling on a grade or meeting increased rolling resistance. A temperature range for setting a target or predetermined temperature to direct the charging oil to the torque converter oil cooling system is 200 to 240° F. For example, the controller could have a predetermined target temperature of the charging oil to be 200° F. and once the charging oil reaches or exceeds this temperature, the oil cooling circuit is activated.

The torque converter oil cooling system is not linked to any cooling system of the vehicle, e.g., share the fan cooling with a vehicle radiator. Therefore, the torque converter system can operate continuously on grade when the torque converter is operating in pre-lockup mode.

Figure 2:
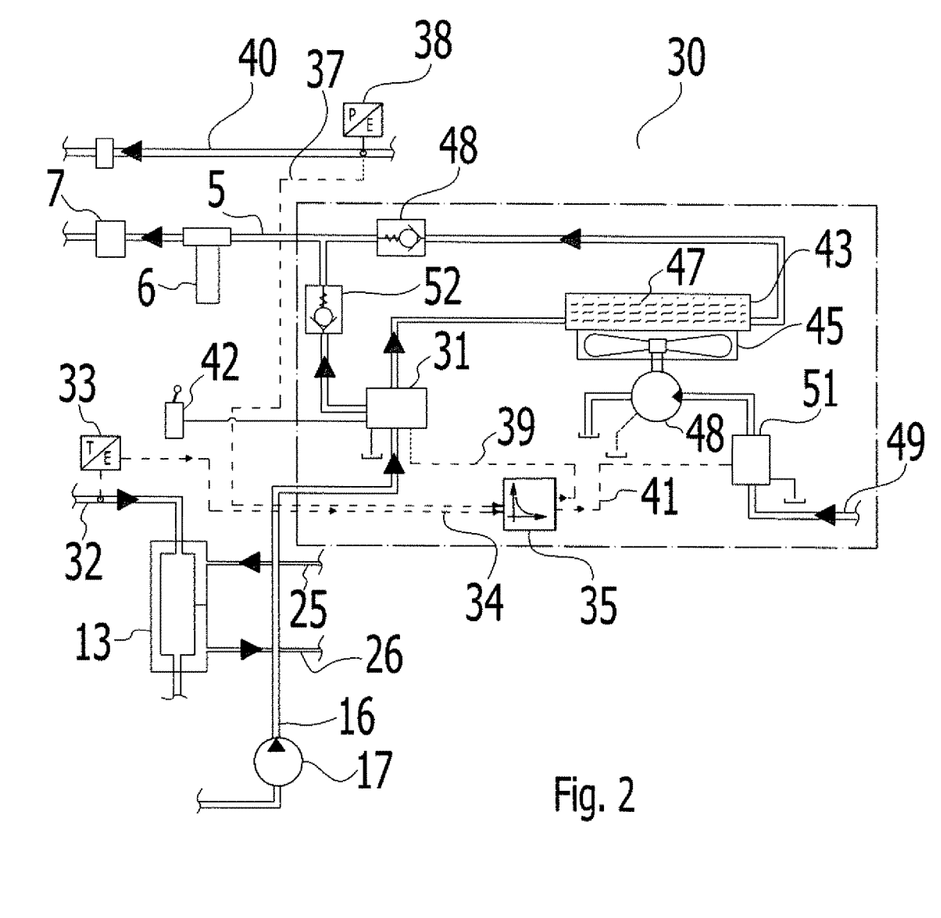
FIG. 2 is a schematic drawing of one embodiment of a torque converter oil cooling system, adapted for use with a torque converter system like that shown in FIG. 1.

FIG. 2 shows a schematic view of one embodiment of the invention and illustrates a torque converter oil cooling system identified by reference numeral 30. The system is designed to be interposed between the outlet 16 of the charging oil pump 17 of an existing torque converter and an inlet 5 to the torque converter, which comprises the charging inlet filter 6 and inlet relief valve 7.

The system 30 includes a directional control valve 31. A temperature sensor 33 monitors the temperature of the oil from the torque converter outlet 32. Also provided is a controller 35. The controller 35 receives a signal 34 from the temperature sensor 33 indicating the temperature of the oil exiting the torque converter.

The controller 35 also receives a pressure signal 37 from sensor 38 which is located in the lockup circuit 40 of the torque converter.

The controller 35 provides two output signals 39 and 41. Signal 39 goes to the directional control valve 31. If the pressure sensor 38 senses that there is no pressure in the lockup circuit 40 from the transmission so that the torque converter is in its operational mode and the temperature of the oil exiting the charging pump is at a predetermined temperature, e.g., more than 200° F., which would be a temperature indicative of the need to further cool the torque converter oil, the controller would send a signal via 39 to the diverter valve 31 so that the charging oil would be directed to the air oil cooling system 43. This would be the operative position wherein torque converter charging oil is being additionally cooled prior to being directed back to the torque converter.

A vehicle having the inventive torque converter oil cooling system could also have a manual override 42, wherein an operator of the vehicle could control the diverter valve 31 via the override and direct charging oil to the torque converter oil cooling system even if the torque converter is in lockup mode.

The air oil cooling system 43 is a system that uses a driven fan 45 to blow air past the coil assembly 47 to further cool the torque converter oil. The fan 45 can be driven in any way but a preferred way is to use the hydraulic drive 48, which uses the hydraulic system of the vehicle having the torque converter 1, which is designated by reference numeral 49. The fan 45 is equipped with a fan control valve 51. The fan control valve 51 controls the flow of hydraulic fluid to the fan 45 to regulate the speed thereof. The fan control valve 51 is told to operate, i.e., rotate the fan based on the signal 41 from the controller 35 because the controller is told that the torque converter is not in lockup mode and the oil temperature is at the predetermined temperature requiring a need for oil cooling or that the oil temperature is such that additional cooling is required even if the torque converter is in lockup mode (the manual override mode). As hydraulically driven motors are well known as is control thereof, a further description of the fan control valve and fan drive is not needed for understanding of the invention.

The cooled oil exits the coil assembly 47, passes the check valve 48 and is returned to the charging inlet 5 for torque converter operation. In the normal bypass position, the torque converter is in lockup mode and the need for cooling the charging oil is not required. Therefore, the controller moves the diverter valve so that the charging oil passes the check valve 52 and returns to the inlet 5 of the torque converter.

Figure 3:
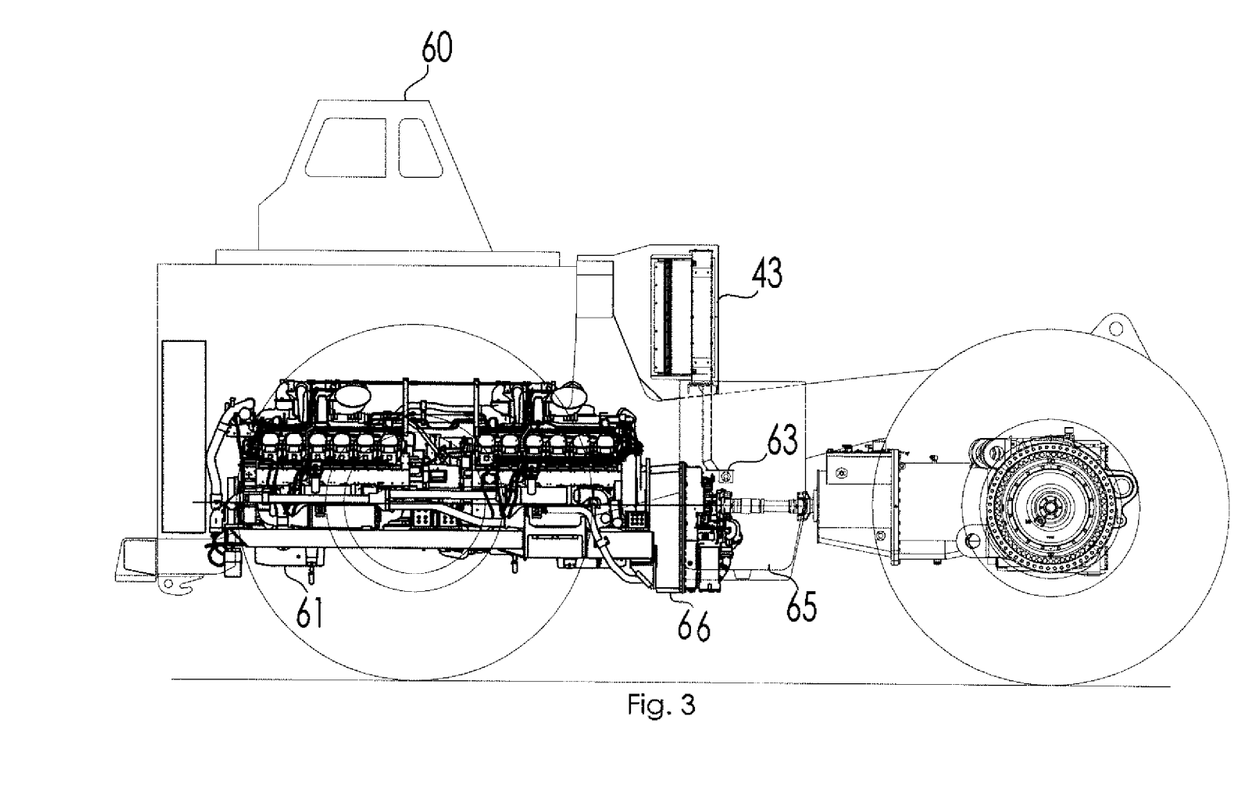
FIG. 3 is a schematic drawing showing the arrangement of the torque converter oil cooling system and a torque converter on a vehicle.

FIG. 3 shows a typical arrangement of the torque converter oil cooling system in a prime mover that would be used to haul heavy equipment using a lowboy trailer. The prime mover is referenced by numeral 60 and is depicted as a 100-400 ton mine truck as an example. The prime mover 60 includes an engine 61, the fan-coil assembly 43 mounted to the prime mover 60, the directional control valve 63, and the vehicle torque converter 66. The power train for the prime mover is designated by 65. This arrangement is only exemplary and other configurations could be used with an existing torque converter on a vehicle.

Figure 4A:
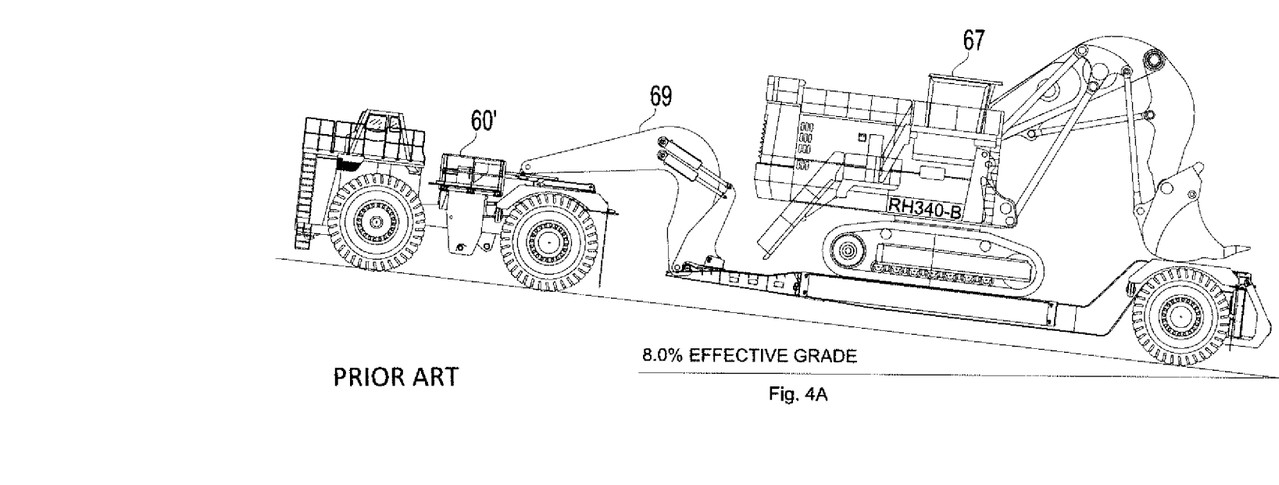
FIG. 4A shows an example of a prior art vehicle towing a lowboy trailer on a certain grade.
Figure 4B:
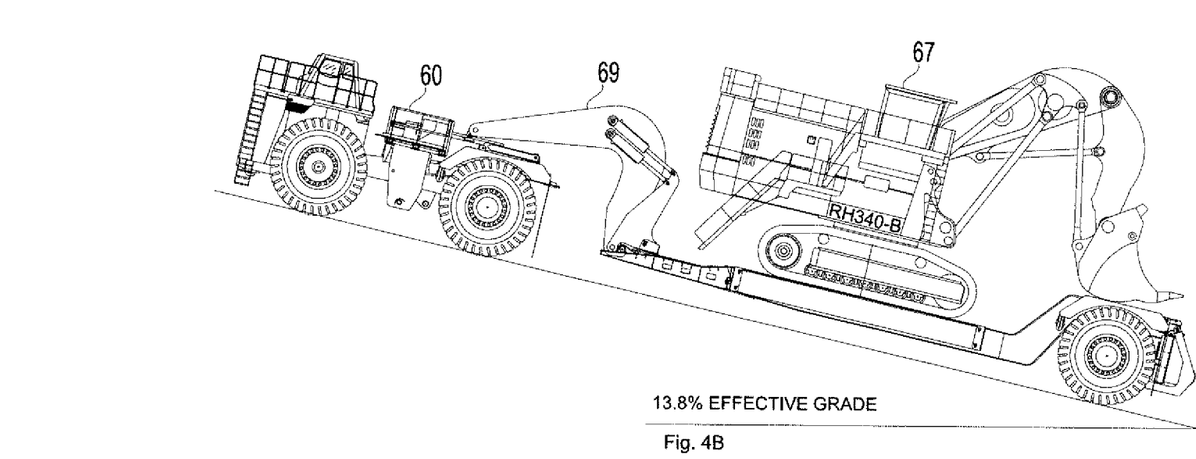
FIG. 4B shows an example of a vehicle having the inventive torque converter oil cooling system towing the same lowboy trailer on a steeper grade.

FIGS. 4A and 4B show an exemplary hauling arrangement using a prior art vehicle and a vehicle with the torque converter oil cooling system of the invention. FIG. 4A shows a prior art prime mover 60' hauling a shovel 67 using a lowboy trailer 69. Without the torque converter oil cooling system, the prime mover 60' can, for example, effectively haul the shovel 67 over an 8% effective grade before the vehicle would just stall out. Effective grade is the actual grade plus a rolling resistance of 2.5%.

Referring to FIG. 4B, using a prime mover 60 shown in FIG. 3, with the torque converter oil cooling system, the shovel can be effectively hauled with a continuous torque converter operation on a grade of 13.8%, which is an increase of roughly 72.5%. Thus, having the torque converter oil cooling system on the prime mover 60 allows the towing operation to traverse steeper grades when moving heavy equipment.

A more sequential and detailed description for the method of cooling the charging oil in connection with vehicle operation is as follows. When a vehicle equipped with the torque converter oil cooling system starts into motion, it will be in torque converter drive, and continue to gain speed until it meets a speed that is programmed, for example 5 mph, into the truck transmission controller. The transmission controller then sends a signal, by means of a pressurized oil line 40 to the torque converter 1 which triggers the torque converter lock-up clutch 3, and establishes a direct power line from the engine to the transmission. In lock-up mode, the torque converter 1 no longer generates the heat loss in the charge oil and there is normally no need for further additional cooling of the charging oil.

The torque converter oil cooling system gets its input parameters by a pressure input from the torque converter lock-up control line via the pressure sensor 38 and a temperature input at the torque converter outlet. The torque converter controller 35 would be programmed as follows:

i. A base temperature is programmed, e.g., 200° F., this is the charge oil temperature leaving the torque converter at which the controller can shift the diverter valve to direct charge oil through the torque converter oil cooling system. Below this base or predetermined temperature, the torque converter oil cooling system would not engage.

ii. In order to complete the shift of the diverter valve, the torque converter oil cooling system must also sense oil pressure in the torque converter lock-up control line.

iii. The maximum temperature, e.g., 240° F. of the charge oil is programmed into the controller, and input for this is from the temperature sensor.

The truck starts into motion in torque converter mode, and if it is on a steep long grade, the oil will heat and when it reaches the base temperature (programmed), and no pressure is in the torque converter lock-up signal line; the controller 35 will shift the diverter valve 31 to direct the charge oil from the pump through the torque converter oil cooling system. As the temperature of the oil begins to rise, the controller will trigger the fan modulated control valve 51 and initiate fan rotation. If the charge oil temperature continues to rise, the controller will increase the fan speed by allowing more oil to flow to the fan motor to increase heat rejection and stabilize the charge oil temperature coming out of the torque converter. This process can continue until the maximum programmed temperature of the charge oil is reached. This is the maximum continuous grade performance that the truck can achieve. The maximum fan speed is set in the modulated fan control valve.

Once the maximum temperature is obtained for the oil, e.g., 240° F., a warning can sound along with the charge oil temperature readout. This would tell the operator that the upper limit for continuous operation has been reached. The truck can continue past this point but only for a short or limited time. The actual maximum charge oil temperature is 255° F. Once the oil temperature would exceed this temperature, the charge oil would begin to coagulate, becoming more cheese=like and give up its lubrication value, so bearings and the slip clutch in the Torque Converter will quickly destruct.

If the oil temperature continues to exceed the maximum temperature, the truck would need to come to a stop and continue to run the engine with the torque converter in neutral. In this mode, the charge oil is still circulating through the torque converter oil cooling system (it is still working) and the power train oil cooler on the truck, and the oil temperature will drop significantly. This allows another travel mode cycle.

In most mines, the top-most actual grades are between 10%-11%. At the 240° F. setting, a 450 ton lowboy loaded and pulled by a 240 ton truck could operate at a 13% actual grade continuously. If the hauling operation would expect a really steep encounter, a pusher dozer can be added to the unit and reduce the rimpull that the truck is experiencing thereby reducing the heat burden.

If the truck continues to travel on a lesser grade and gains speed (~5 mph) to lock-up mode, the transmission controller will send a lock-up signal and the heat generation will stop and the water-oil cooler on the truck will dissipate any required heat. The torque converter oil cooling system will shift the diverter valve and disengage the torque air oil cooling system, thus directing the charge oil from the pump directly to the torque converter.

The torque converter oil cooling system will not normally operate in torque converter lock-up mode. However, there can be a manual override switch in the cab of the vehicle that would engage/disengage the torque converter oil cooling system which could under special circumstances require it to be engaged.

Figure 5:
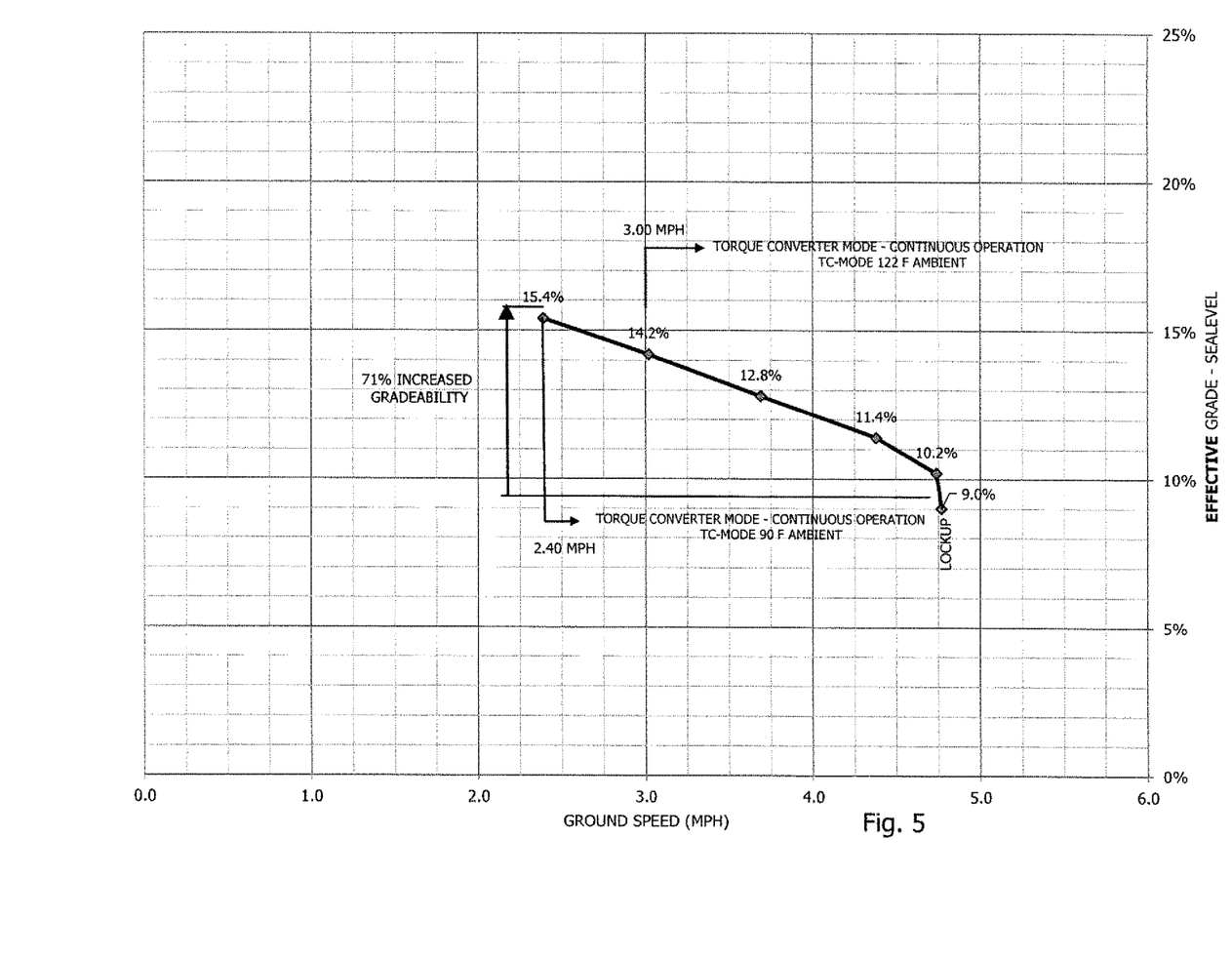
FIG. 5 shows a graph comparing ground speed to an effective grade and the performance of a prime mover using the invention torque converter oil cooling system.

FIG. 5 shows a performance graph relating effective grade, ground speed, and ambient temperature for a prime mover like that depicted in FIGS. 4A and 4B. This graphs shows that the lockup mode occurs at a speed of about 4.8 MPH. What the graph also shows is a baseline of 9.0% effective grade, which is the capability of a prior art prime mover that would only use the water to oil cooler 13. With the inventive torque converter oil cooling system, the gradeability is increased. This increase in gradeability varies with ambient temperature. For example, the performance curve shows that a maximum increase in gradeability with continuous performance of the torque converter can be obtained at the lowest speed of 2.4 MPH and at a 90° F. ambient temperature, i.e., from 9.0% effective grade to 15.4% effective grade or a 71% increase. As the heat load increases with decreasing speed of the vehicle, going lower than the 2.4 MPH speed, in effect, results in further increases in the temperature of the oil to the extent that the oil can approach or exceed the target maximum of 240° F. If the ambient temperature is 122° F., the maximum gradeability is decreased to 14.2% at a lowest target speed of 3.0 MPH. The decrease in gradeability is a result of the higher ambient temperature and lesser heat exchange efficiency of the torque converter oil cooling system.

Figure 6:
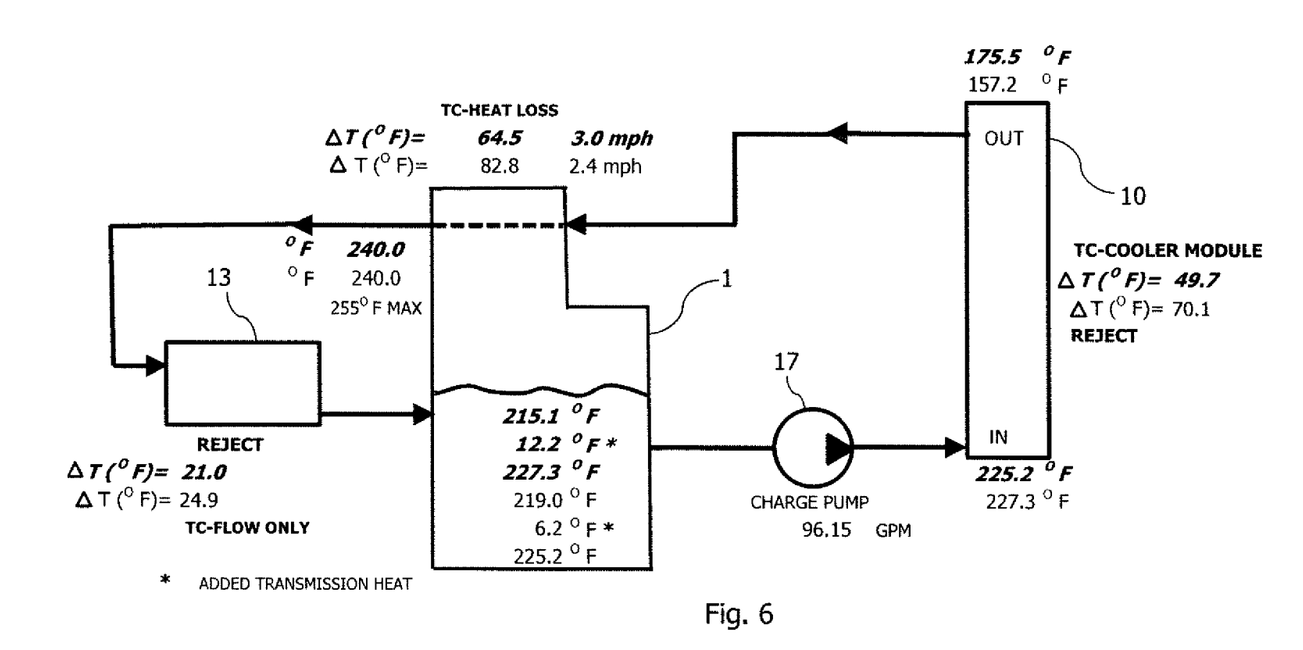
FIG. 6 shows a schematic flow chart based on two ambient temperatures and oil temperature changes during the torque converter operation.

FIG. 6 is an exemplary flow chart showing temperatures of the charging oil at different points in the overall system for ambient temperatures of 90 and 122° F. More particularly and for the 90° F. ambient temperature, the charging pump 17 directs oil to the torque converter oil cooling system 10 at a temperature of 227.3° F. The oil is cooled to 157.2° F. upon exiting of the torque converter oil cooling system 10 and returns to the torque converter 1 with the vehicle speed being 2.4 mph. This generates an increase in the oil temperature of 82.8° F. so that the oil exiting the torque converter is 240° F. The water to oil cooler 13 reduces the temperature by 24.9° F. so that the oil temperature is now 215.1° F. Taking into account transmission heat, that raises the temperature 12.2° F., the oil entering the charging pump is 227.3° F. The increase in temperature due to the transmission is a known artifact of torque converter systems as some of the torque converter components also involve the transmission system, e.g. the oil charging pump and a further description of this is not needed for understanding of the invention. At this point, the oil temperature is over the base temperature of 200° F., which in turns means that the controller 35 moves the diverter valve into the operative position for oil cooling. FIG. 6 also shows the temperature changes for the system when the ambient temperature is 122° F. These temperatures are shown bold and italicized text.

The invention has a number of advantages over the prior art. While the existing design and operation of a prior art torque converter is adequate for the service duty cycle of the vehicle for its intended purpose, there are other transport applications that require a slower speed higher torque version of the vehicle to achieve the intended design purpose. One such purpose is as a prime power mover for mining lowboy applications while transporting loads with a lowboy connected on steep grades. The ability to operate in torque converter drive for extended periods as a result of using the torque converter oil cooling offers the same advantage as a deeper gear ratio, slower speed with resulting higher torque or gradeability.

Since the torque converter oil cooling system is modular and does not have to interface with any of the systems on the vehicle, whether it be control systems or other systems, it can be easily installed on an existing vehicle so as to readily obtain the benefits of increased gradeability for hauling operations.

Other advantages include the following:

1. The torque converter oil cooling system is a non-invasive system allowing the original circuit to stay intact operationally.

2. The addition of the torque converter oil cooling system provides a heat rejection option that does not depend on or burden the cooling system on the vehicle, but rather complements it.

3. When the cooler of the torque converter oil cooling system is sized for a particular heat rejection capacity, this facilitates a speed range in torque converter drive condition for continuous operation without overheating the torque converter charge oil.

4. The torque converter oil cooling system equips a vehicle to operate with higher torque at the drive wheels continuously, resulting in significantly greater gradeability over an extended period of time.

5. The torque converter oil cooling system can be configured to operate with a variety of vehicles equipped with a torque converter.

6. The torque converter oil cooling system offers a cost effective low maintenance alternative to expand vehicle propulsion capability and therefore application usage.

While the torque converter oil cooling system is disclosed for application in prime movers, any industrial application wherein a torque converter is used that may need additional charging oil cooling would be a candidate to use the torque converter oil cooling system.

As such, an invention has been disclosed in terms of preferred embodiments thereof which fulfills each and every one of the objects of the present invention as set forth above and provides a new and improved method of hauling heavy equipment and a torque converter oil cooling system that permits the improvements in equipment hauling.

Of course, various changes, modifications and alterations from the teachings of the present invention may be contemplated by those skilled in the art without departing from the intended spirit and scope thereof. It is intended that the present invention only be limited by the terms of the appended claims.

I claim:
1. A torque converter oil cooling system comprising:
   a) an inlet to receive oil discharged for a torque converter oil charging pump;
   b) an oil cooler coil assembly having a fan configured to blow air across the coil assembly to cool torque converter oil passing through the coil assembly, the oil cooler coil assembly having an inlet and an outlet;
   c) a diverter valve, the diverter valve directing torque converter oil either back to an inlet for a torque converter system or to the inlet of the oil cooler coil assembly for cooling of the torque converter oil;
   d) a temperature sensor positioned at an outlet of the torque converter system, the temperature sensor configured to send a signal indicative of a temperature of the torque converter oil discharged from the outlet of the torque converter system,
   e) a controller adapted to control the position of the diverter valve between an operative position and a bypass position, the operative position based on a predetermined torque converter temperature from the temperature sensor and a signal from a torque converter system indicating an absence of a lockup mode for the torque converter system, wherein when the torque converter oil discharged from the torque converter oil charging pump reaches the predetermined torque converter oil temperature, the diverter valve is put in the operative position to direct torque converter oil to the oil cooler coil assembly for cooling of the torque converter oil and return to the inlet of the torque converter system,
   the bypass position directing torque converter oil from the torque converter oil charging pump to the inlet of the torque converter system via the diverter valve when the predetermined torque converter oil temperature is not reached.

2. The system of claim 1, wherein the controller includes a second predetermined temperature, the second predetermined temperature providing an indication that the vehicle operation should be stopped or stopped in a predetermined amount of time to avoid damaging of the torque converter system.

3. The system of claim 1, wherein the fan is hydraulic fluid-driven, the hydraulic fluid being part of a vehicle having the torque converter system.

4. The system of claim 1, further comprising a manual override control connected to the diverter valve, the manual override control allowing the diverter valve to move to the operative position even if the torque converter system is in lockup mode.

5. The system of claim 1, further comprising a pressure sensor adapted to be located in a lockup circuit of the torque converter system for monitoring the lockup mode of the torque converter system for diverter valve positioning.

6. A vehicle comprising:
 a torque converter system, wherein the torque converter system is separate from a transmission of the vehicle, a torque converter oil circuit of the torque converter system being independent of oil used in the vehicle transmission, the torque converter system including an torque converter oil charging pump to take cooled torque converter oil exiting the torque converter system and recirculate the cooled torque converter oil to an inlet for the torque converter system for use in a torque converter system; and
 a torque converter oil cooling system according to claim 1, wherein the inlet of the torque converter oil cooling system is in communication with the outlet of the torque converter oil charging pump and an outlet of the torque converter oil cooling system is in communication with the inlet of the torque converter system.

7. The vehicle of claim 6, wherein the vehicle is a mining vehicle.

8. A method of outputting engine torque comprising:
 providing a torque converter system in a vehicle, wherein the torque converter system is separate from a transmission of the vehicle, a torque converter oil circuit of the torque converter system being independent of oil used in the vehicle transmission, the torque converter system including a torque converter oil cooling charging pump to take cooled oil exiting the torque converter system and recirculate the cooled oil to an inlet for the torque converter system for use in the torque converter system; and
 cooling oil exiting the oil cooling charging pump system when either the torque converter oil exiting the oil charging pump reaches or exceeds a predetermined temperature and the torque converter system is not in lockup condition or when the torque converter oil exiting the torque converter system reaches or exceeds a second predetermined temperature when the torque converter system is in lockup condition using the torque converter oil cooling system of claim 1.

9. The method of claim 8, further comprising providing a prime mover with the torque converter oil cooling system; and
 towing a lowboy trailer with equipment thereon using the prime mover.

* * * * *